United States Patent [19]
Sugawara et al.

[11] Patent Number: 4,735,923
[45] Date of Patent: Apr. 5, 1988

[54] EROSION-RESISTANT SILICON CARBIDE COMPOSITE SINTERED MATERIALS

[75] Inventors: Jun Sugawara; Shumei Hosokawa, both of Fukuoka, Japan

[73] Assignee: Kurosaki Refractories Co., Ltd., Kitakyushu, Japan

[21] Appl. No.: 896,167

[22] Filed: Aug. 13, 1986

[30] Foreign Application Priority Data

Aug. 21, 1985 [JP] Japan ................................. 60-184641

[51] Int. Cl.$^4$ ........................ C04B 35/52; C04B 35/56
[52] U.S. Cl. ........................................ 501/89; 501/88; 501/92
[58] Field of Search ................................ 501/88, 89, 92; 204/243 R

[56] References Cited

U.S. PATENT DOCUMENTS

| | | | |
|---|---|---|---|
| 3,775,137 | 11/1973 | Clougherty et al. | 501/92 |
| 4,511,449 | 4/1985 | Molnar | 204/243 R |
| 4,555,358 | 11/1985 | Matsushita | 501/92 X |
| 4,636,481 | 1/1987 | Kida | 501/92 X |
| 4,668,643 | 5/1987 | Kida | 501/92 |
| 4,678,759 | 7/1987 | Kida | 501/92 |

FOREIGN PATENT DOCUMENTS

| | | | |
|---|---|---|---|
| 0170864 | 2/1986 | European Pat. Off. | 501/89 |
| 0161467 | 8/1985 | Japan | 501/92 |
| 1026570 | 2/1986 | Japan | 501/92 |
| 2140823 | 6/1980 | United Kingdom . | |

Primary Examiner—William R. Dixon, Jr.
Assistant Examiner—James M. Hunter, Jr.
Attorney, Agent, or Firm—Jordan and Hamburg

[57] ABSTRACT

Erosion-resistant silicon carbide composite sintered material, produced from starting materials composed mainly of SiC and also containing $ZrB_2$ added thereto in an amount up to 50 volume %, resist penetration of, and erosion by, molten metals (such as molten steel) and show high erosion resistance, while retaining the outstanding characteristics unique to silicon carbide, such as high resistance to oxidation, creep and abrasion, and high mechanical strength and impact resistance at high temperatures. Thus the products can be advantageously used as protective pipes for molten metals, crucibles, rollers, nozzles, dies, blow pipes, agitator blades, rotating shafts, inner linings and other structural members which are to be used while in contact with molten metals (particularly molten steel) or other high-temperature metal parts. The corrosion resistance is particularly outstanding when the sintered materials additionally include metallic aluminum or an aluminum compound such as $Al_4C_3$, $AlN$, $AlB_2$, and $Al_2O_3$ in an amount ranging from 5 to 20 vol. % based on the silicon carbide, without detrimentally affecting the mechanical and oxidation resistance properties of the sintered materials.

2 Claims, No Drawings

EROSION-RESISTANT SILICON CARBIDE COMPOSITE SINTERED MATERIALS

BACKGROUND OF THE INVENTION

This invention relates to SiC-Al compound-$ZrB_2$ composite sintered materials with improved erosion resistance to molten metals, particularly to molten steel.

High-melting metal oxides, such as alumina, magnesia and zirconia, have been used as a refractory material constituting members which are left immersed in, or kept in contact with, molten steel, such as nozzles, lining material, and blow pipes.

These refractory materials of the metal oxide type, however, are not satisfactory in mechanical properties, such as mechanical strength at high temperatures, creep characteristics and abrasion resistance, and suffer from short service lives, often causing erosion loss, breakage and other troubles during service.

Under such circumstances, it was attempted to use, in place of these metal-oxide refractories, silicon carbide and silicon nitride, which are richer in covalent bonding and show better mechanical properties at high temperatures, as described in Japanese Patent Application Laid-open No. 57-123916.

Structural members made of silicon carbide, although highly erosion-resistant against high temperature slag, tend to react with molten ferrous metals (such as molten steel) and oxides thereof, causing erosion loss, deposition of the ferrous metals or oxides thereof, and other troubles. Thus, the outstanding characteristics unique to silicon carbide have not been fully exhibited.

SUMMARY OF THE INVENTION

The object of this invention is to provide erosion-resistant silicon carbide composite sintered materials which retain the outstanding characteristics unique to silicon carbide, have lowered reactivity with molten metals (such as molten steel) and oxides thereof, show improved erosion resistance to these substances, and are therefore suited for use as structural members to be used in contact with molten metals, particularly molten steel.

This invention is based on the finding that sintered products obtained from starting materials composed mainly of SiC and also containing $ZrB_2$ show high erosion resistance to molten metals.

DETAILED DESCRIPTION OF THE PREFERRED EMBODIMENTS

The proportion of each compound is herein expressed by volume % calculated according to the following formula:

$$V = W/\rho$$

wherein V is the volume ($cm^3$) of a compound, W is its weight (g) and $\rho$ is its true density ($g/cm^3$). True density ($\rho$) is assumed to be 3.21 $g/cm^3$ for SiC and 6.09 $g/cm^3$ for $ZrB_2$.

The effect of adding $ZrB_2$ to SiC is more marked as its amount increases. But, if the amount exceeds 50 volume %, it adversely affects the favorable properties unique to SiC, such as high resistance to oxidation, creep and abrasion, and high mechanical strength and impact resistance at high temperatures, making the resulting composite SiC material unsuitable as high-temperature structural materials. Hence the amount of $ZrB_2$ added must be less than 50 volume %.

It was experimentally demonstrated that the effect of adding $ZrB_2$ is particularly outstanding when the SiC matrix contains an aluminum element.

An aluminum element can be added to the matrix in the form of metallic aluminum or aluminum compounds, such as $Al_4C_3$, AlN, $AlB_2$ and $Al_2O_3$. Alternatively, the aluminum element may be added in the manufacturing step of the SiC powder to form a solid solution thereof.

Of the aluminum compounds mentioned above, AlN is the most effective because it forms a solid solution in SiC in any proportion and hence can be dispersed uniformly in a SiC matrix, as reported in J. American Ceramic Society, No. 65, p. 260 (1982).

The effect of adding an aluminum element is probably that it changes the composition of the SiC surface layer and the new surface layer of this modified composition shows high erosion resistance to molten steel, thus retarding direct contact of SiC with molten steel and preventing SiC from decomposing and being dissolved in molten steel.

The suitable amount of Al compound to be added is in the range from 5 to 20 volume % of SiC powder, and the best result is obtained when 5 to 50 volume % of $ZrB_2$ has been added to a SiC/aluminum compound matrix of the above composition.

Silicon carbide is the main component of the starting materials for the manufacture of sintered materials according to this invention, but composite carbides consisting of SiC and carbides of other metals, such as Ti, W, Ta, Nb, Cr, Hf, Y and Yb, may also be used. In this case, up to 5 volume % of SiC can be replaced by other metal carbides.

Any molding methods commonly used for ceramic powder may be employed for the manufacture of erosion-resistant silicon carbide composite sintered materials of this invention. These include uniaxial pressing such as oil press and friction press, casting, extrusion, injection, hydrostatic rubber pressing and hot pressing.

Sintering can be employed under normal pressure; there is no need for sintering under pressure (such as hot pressing and HIP). Thus, products of complex structure can be easily manufactured. This provides great economic advantages for the production of such ceramic products in which machining costs take a substantial part.

Since the addition of $ZrB_2$ results in a drop in electrical resistance of SiC sintered materials, electrical discharge machining can be applied to the resulting moldings. This is very advantageous for manufacturing products of complex structure.

The silicon carbide composite sintered materials of this invention retain the outstanding characteristics unique to silicon carbide, such as high resistance to oxidation, creep and abrasion, and high mechanical strength and impact resistance at high temperatures, resist penetration of, and erosion by, molten metals (such as molten steel), and have higher erosion resistance. Erosion-resistant structural members for high-temperature service having complicated structure can be easily manufactured because sintering under normal pressure and electrical discharge machining are applicable.

With these outstanding characteristics, the silicon carbide composite sintered materials of this invention can be advantageously used as protective pipes for molten metals, crucibles, rollers, nozzles, dies, blow pipes, agitator blades, rotating shafts, inner linings and other structural members which are to be used while in contact with molten metals (e.g., steel) or other high-temperature metal parts. In addition, the lower electrical resistance than plain SiC sintered materials make them usable as a material for heaters and electrodes which are kept in contact with molten or high-temperature metals during service.

The following Examples will further illustrate the invention.

EXAMPLE 1

To a matrix powder composed of 90 volume % of $\alpha$-SiC powder with an average particle size of 0.4 $\mu$m, and 10 volume % of AlN powder with an average particle size of 2 $\mu$m, was added a varying amount of $ZrB_2$ powder (2 to 50 volume %). The resulting powder mixture (100 parts by weight) was mixed with a novolak resin (6 parts by weight) and acetone in a ball mill for 50 hours, the slurry thus obtained was subjected to wet granulation to give granules (25×25×120 mm) under a hydrostatic pressure of 3000 Kg/cm$^2$, and the granules were then heated in an Ar atmosphere at a rate of 5° C./min. and sintered at 2000° C. for two hours.

A comparative sample was prepared by sintering a mixture composed of $\alpha$-SiC powder (100 parts by weight), $B_4C$ (1 part) and a novolak resin (6 parts) at 2150° C. for two hours.

These samples were machined into a size of 20×20×80 mm, and subjected to a molten steel immersion test using a high-frequency induction furnace. The specimens were immersed in 1600° C. molten steel for 120 minutes, and erosion loss was evaluated from their residual volume. The result is summarized in Table 1.

TABLE 1

| | SiC:AlN ratio in matrix (vol.) | $ZrB_2$ (vol. %) | Bulk density (% per theoretical value) | Residual volume after immersion test (%) |
|---|---|---|---|---|
| * | 100:0 | 0 | 98.0 | 0 |
| 1 | 90:10 | 2 | 97.5 | 3 |
| 2 | 90:10 | 5 | 97.8 | 20 |
| 3 | 90:10 | 10 | 97.3 | 75 |
| 4 | 90:10 | 20 | 96.9 | 98 |
| 5 | 90:10 | 30 | 97.0 | 100 |
| 6 | 90:10 | 50 | 96.2 | 100 |

*Comparative sample

EXAMPLE 2

A sintered product was manufactured in the same manner as in Example 1, except that a mixture of 80 volume % of SiC powder with an average particle size of 0.8 $\mu$m incorporating 3 mol.% of an aluminum element in the form of a solid solution, with 20 volume % of $ZrB_2$ powder, was used as starting materials. The bulk density of the sintered product thus obtained was 96.5% of the theoretical value. This sample was machined to a size of 20×20×80 mm, and the specimen thus prepared was subjected to the same immersion test as in Example 1. The residual volume after the test was approximately 95%.

Its three-point bending strength, when measured by the method specified in JIS R1601, was 65 Kg/mm$^2$ at room temperature and 58 Kg/mm$^2$ at 1400° C.

EXAMPLE 3

A sintered product was manufactured in the same manner as in Example 1, except that a mixture of matrix powder composed of 90 volume % of $\alpha$-SiC powder with an average particle size of 0.4 $\mu$m and 10 volume % of $Al_4C_3$ with an average particle size of 3 $\mu$m, with 30 volume % of $ZrB_2$ powder, was used as starting materials. The bulk density of the sintered product thus obtained was 96.0% of the theoretical value. This sample was machined to a size of 20×20×80 mm, and the specimen thus prepared was subjected to the same immersion test as in Example 1. The residual volume after the test was approximately 95%.

Its three-point bending strength, when measured by the method specified in JIS R1601, was 59 Kg/mm$^2$ at room temperature and 50 Kg/mm$^2$ at 1400° C.

EXAMPLE 4

Sintered products were manufactured in the same manner as in Example 1, except that a mixture of matrix powder composed of 90 volume % of $\alpha$-SiC powder with an average particle size of 0.4 $\mu$m and 10 volume % of AlN powder with an average particle size of 2 $\mu$m, with a varying amount of $ZrB_2$ powder (30, 50 and 70 volume %), was used as starting materials. The bulk density of the sintered products thus obtained were 98.2%, 96.7% and 95.4% of the theoretical value, respectively.

These samples were heated at 1400° C. in dry air for 100 hours to evaluate the oxidation resistance. In the 30%-$ZrB_2$ product, a thin, transparent oxide layer was formed on the surface, but no drop in strength due to oxidation was observed. In the 50%-$ZrB_2$ product, a translucent surface layer was formed, but the strength retained 90% of the strength level before the test. In the 70%-$ZrB_2$ product, on the other hand, whitening and blistering occurred over the entire surface and the strength dropped markedly (to about 50% of the original level).

EXAMPLE 5

Sintered products were manufactured in the same manner as in Example 1, except that a mixture of SiC matrix powder containing a varying amount of Al compound (2 to 30 volume % as shown in Table 2), with 20 volume % of $ZrB_2$ powder, was used as starting materials. The results of immersion test and three-point bending test are summarized in Table 2.

EXAMPLE 6

A sintered product was manufactured in the same manner as in Example 1, except that a mixture of matrix powder composed of 82 volume % of $\alpha$-SiC powder with an average particle size of 0.4 $\mu$m, 8 volume % of TiC powder with an average particle size of 1.4 $\mu$m and 10 volume % of $Al_4C_3$ powder with an average particle size of 3 $\mu$m, with 30 volume % of $ZrB_2$ powder, was used as starting materials. The bulk density of the sintered product thus obtained was 95.2% of the theoretical value. This sample was machined to a size of 20×20×80 mm, and the specimen thus prepared was subjected to the same immersion test as in Example 1. The residual volume after the test was approximately 97%.

Its three-point bending strength, when measured by the method specified in JIS R1601, was 42 Kg/mm$^2$ at 1400° C.

TABLE 2

| Al cpd. in matrix powder (vol. %) | $ZrB_2$ (vol. %) | Residual volume after immersion test (%) | Three-point bending strength (Kg/mm$^2$)* |
| --- | --- | --- | --- |
| 7  AlN 2      | 20 | 70 | 60 |
| 8  AlN 5      | 20 | 92 | 58 |
| 9  AlN 20     | 20 | 99 | 40 |
| 10 AlN 30     | 20 | 98 | 20 |
| 11 Al$_4$C$_3$ 5  | 20 | 85 | 52 |
| 12 Al$_4$C$_3$ 10 | 20 | 98 | 47 |
| 13 AlB$_2$ 2  | 20 | 60 | 55 |
| 14 AlB$_2$ 5  | 20 | 85 | 53 |
| 15 AlB$_2$ 10 | 20 | 96 | 42 |
| 16 Al$_2$O$_3$ 5  | 20 | 88 | 45 |
| 17 Al$_2$O$_3$ 10 | 20 | 98 | 35 |
| 18 Al$_2$O$_3$ 20 | 20 | 99 | 25 |
| 19 Al$_2$O$_3$ 30 | 20 | 99 | 8  |
| 20 Al 2       | 20 | 65 | 48 |
| 21 Al 5       | 20 | 90 | 45 |
| 22 Al 5 + AlN 5 | 20 | 98 | 48 |
| 22 AlB$_2$ 5 + AlN 5 | 20 | 99 | 50 |

*Bending strength at 1400° C.

What is claimed is:

1. An erosion-resistant silicon carbide sintered composite material consisting of a silicon carbide-aluminum compound-zirconium diboride composite sintered material obtained from a powdered mixture of 95–50 vol% SiC, in which 5–20 volume% of the SiC has been replaced by an Al compound based on the total volume of SiC, and 5–50 volume% of $ZrB_2$ based on the volume of the SiC/aluminum compound matrix.

2. An erosion-resistant silicon carbide sintered composite material as in claim 1, wherein the aluminum compound is selected from the group consisting of Al$_4$C$_3$, AlN, AlB$_2$ and Al$_2$O$_3$.

* * * * *